United States Patent [19]

Debouzie et al.

[11] Patent Number: 4,664,691
[45] Date of Patent: May 12, 1987

[54] SUPPLY OF FIBER MATERIAL IN FIBER PRODUCING TECHNIQUES

[75] Inventors: Alain Debouzie, Le Petit-Couronne; Daniel Sainte-Foi, Clermont, both of France

[73] Assignee: Isover Saint-Gobain, Courbevoie, France

[21] Appl. No.: 792,883

[22] Filed: Oct. 30, 1985

[30] Foreign Application Priority Data

Oct. 30, 1984 [FR] France ............... 84 16547

[51] Int. Cl.4 ............................................ C03B 37/05
[52] U.S. Cl. ............................................ 65/6; 65/8; 65/14; 65/15; 65/19
[58] Field of Search ............ 65/6, 8, 14, 15, 16, 65/19

[56] References Cited

U.S. PATENT DOCUMENTS

| 1,008,204 | 11/1911 | Seghers | 65/19 |
| 1,646,705 | 10/1927 | Peiler | 65/164 |
| 1,677,275 | 10/1928 | Deuley | 65/259 |
| 2,192,524 | 3/1940 | Powell | 65/16 |
| 2,663,051 | 12/1953 | Graybeal | 65/8 |
| 2,880,456 | 4/1959 | Kuzela et al. | 65/15 X |
| 3,395,995 | 8/1968 | Burch | 65/19 |
| 4,433,992 | 2/1984 | Debouzie et al. | 65/3.1 |
| 4,541,854 | 9/1985 | Schonhaar et al. | 65/15 |

FOREIGN PATENT DOCUMENTS

| 135499 | 1/1948 | Australia | 65/15 |
| 161401 | 11/1957 | Sweden | 65/19 |

Primary Examiner—Robert Lindsay
Attorney, Agent, or Firm—Oblon, Fisher, Spivak, McClelland & Maier

[57] ABSTRACT

The invention relates to the production of mineral fibers from a material melted in a cupola. To regularize the supply of material to the fiber-forming apparatus, the material emanating from the cupola and conveyed to the apparatus passes through a reserve.

15 Claims, 5 Drawing Figures

SUPPLY OF FIBER MATERIAL IN FIBER PRODUCING TECHNIQUES

BACKGROUND OF THE INVENTION

The invention relates to mineral fibre producing techniques in which the material to be fibered is carried in the molten state over the periphery of centrifuging wheels, is conveyed by these wheels and then becomes detached therefrom in the form of fibers under the effect of centrifugal force. In these techniques, more often than not a plurality of wheels are used which are disposed in proximity to one another. The material poured onto the first wheel is accelerated and thrown onto the following a wheel. A part of this material forms fibers and the excess is passed on to the following wheel to result in formation of additional fibers.

These fiber producing techniques are very currently used industrially with materials for which the processing temperature is relatively high. In particular, they are materials such as basaltic rocks, blast furnace slag or compositions based on such slag, and more generally all glasses which only melt at an elevated temperature.

Employing these techniques is interesting from various points of view. For example, fibers produced by using glasses having a high melting point are advantageously used in materials which have to be fireresistant. The cost of producing these fibers is therefore relatively moderate in relation to that for other fiber forming techniques. However, this type of technique does have certain drawbacks. One of the most important is the fact that even when choosing the best conditions known to date, the efficiency of the operation is not entirely satisfactory. With the fibers, a not inconsiderable quantity of unfibered products is formed which reduces the efficiency of production. Furthermore, despite systematic elimination, part of the unfibered products remains in the products obtained, the properties of which become modified.

For these reasons, improvements in these techniques resulting in better conversion of the molten mass into fibers are desirable and many attempts have been made along these lines.

Some investigators have been mainly concerned with the conditions of centrifugal processing and have sought better combinations of diameters and speeds of wheel rotation. Others have devoted their attention to the wheel environment and in particular to the gas currents blowing along the wheels and intended to separate the fibers from the unfibered matter or even to the drawing of the fibers.

Many proposals have been forthcoming which likewise relate to the surface condition of the wheels to encourage "hooking on" of the material and therefore drawing of the fibers.

Substantial improvements have been obtained. Nevertheless, increased efficiency is still desirable.

SUMMARY OF THE INVENTION

The object of the invention is to provide an improved technique for this type of fiber production. In particular, the invention is aimed at a technique by which it is possible to obtain greater efficiency of conversion to fibers and hence products which contain less unfibered material.

The inventors have found that it is possible to improve fiber formation by more precisely controlling the conditions in which the molten material intended for forming the fibers is conveyed to the centrifuging wheels from the melting container.

Studies carried out by the inventors and resulting in the present invention have shown that the supply of molten material by the conventional method is subject to quite substantial variations in rate of flow. These studies have likewise shown that these variations in flow become translated into a reduction in the efficiency of conversion to fibers.

Traditionally, the preparation of materials to be fibered is carried out in furnaces known as "cupolas", using a method similar to the methods developed in foundry work. The cupola is charged at the top with alternating layers of coke and layers of the material to be fibered. Combustion of the coke with air at the base of the cupola carries the charge to the temperature needed to bring about fusion of the mixture forming the material to be fibered. At the pouring hole of the cupola there is constant competition between the pressure exerted by the molten material and that exerted by the gases which are escaping. This competition is reflected in a jerky flow.

The use of this technique of melting in a cupola also entails further difficulties. For example, independently of the regularity of the rate of flow of molten material, there are other factors which may disturb the supply. In particular, these may be momentary variations in temperature which are more or less linked with the variations in rate of flow. Also, there may be undesirable elements present in the flow of materials. For example, the flow may entrain more or less bulky particles of incandescent coke.

As far as is possible, these particles must be eliminated. Indeed, if these particles get as far as the chamber in which the formed fibers are coated with an organic binder, they represent a not inconsiderable inflammatory hazard which means that the product formed must be disposed of.

Further heterogeneous elements may originate from the raw materials used for preparing the material which are intended to form the fibers. Infusible products may be entrained, but above all when their composition includes a certain proportion of iron oxide, in order to improve the fire resistance, it is not uncommon for a small proportion of cast iron to be produced. If it passes along with the molten material, this cast iron will lead to very rapid wear and tear of the centrifuging wheels.

Ordinarily, the pouring hole of the cupola is situated a little above the bottom so that the molten metal produced accumulates in the bottom part from which it is periodically withdrawn by emptying. Nevertheless, this operation is inconvenient and requires production to be stopped from time to time. Furthermore, this separation is not always perfect by reason of the high viscosity of the material being melted and drops of cast iron may be entrained with the flow of molten material.

One aim of the invention is to improve the regularity in the supply of material to be fibered in techniques such as those mentioned above in which the material is melted in a cupola. One object of the invention is in particular to improve the regularity in the rate of flow and that of the temperature of the material delivered to the fiber forming apparatus.

Another object of the invention is to see, that any heterogeneous elements which may be entrained with the molten material are eliminated before reaching the centrifuging apparatus.

Generally, an object of the invention is to improve the efficiency of conversion of the material to fibers.

The inventors have shown that quite significant improvements might be obtained by forming a reserve in the path of the molten material between the cupola and the centrifuging apparatus.

Ordinarily, the molten material emerging from the cupola is conveyed directly by one or more channels to the fiber forming apparatus. The purpose of these channels is solely to convey the material. In practice, every effort is made to see that the cupola is kept very close to the centrifuging apparatus to avoid the molten material cooling. Consequently, transfer of the material from the cupola to the first centrifuging wheel is carried out in a matter of fractions of a second and the greater the rate of flow, the more unstable the situation is.

Incorporating a reserve into the path of the material makes it possible to more satisfactorily control the supply. This reserve can be set up in various ways. Preferably and for reasons relating particularly to convenience and maintenance, the flow of material is carried out through pipes which are open to the atmosphere. In other words, the material is not confined in an enclosed space from the moment it emerges from the cupola. The reserve employed according to the invention also has a free surface. This surface and therefore the dimensions of the reserve are chosen so that momentary variations in rate of flow of material emanating from the cupola give rise to only very slight variations in the level in the reserve. Under these conditions, no matter how the material emerges from the reserve, its rate of flow on leaving cannot be greatly affected at any given time.

Preferably, the free surface of the reserve is such that having regard to any variations found in the rate of flow from the cupola, variations upon emergence from the reserve do not exceed 4% and are preferably less than 2% of the mean rate of flow.

The volume of the reserve also makes it possible to ensure satisfactory homogenization of the material both in terms of composition and with regard to temperature. The greater the volume and on condition that no "dead" zones form, that is to say zones in which the material is not worked continuously, the better is the homogenization which can be achieved. In practice, however, this volume is limited. As soon as it emerges from the cupola, the volume cools. In the reserve, this cooling is increased as a function of the area of contact with the walls of the vessel in which the reserve is built up and hence the volume of material is reduced. Similarly, cooling occurs via the free surface. Cooling must be limited as a function of the temperature needed to obtain good fiber forming conditions. Therefore, it is appropriate to choose the volume of the reserve while bearing in mind the temperature of the material, the input and rate of flow of the material and the temperature required at the outlet.

Furthermore, excessively intense cooling would lead in the extreme to devitrification of the material in the coolest zones. A fraction of the volume of the reserve would then be unusable. The presence of solidified masses may further modify the conditions of circulation of the material and lessen the desired homogenization effect. In an embodiment according to the invention, although devitrified zones may form locally, they are in all cases restricted in such a way as to not substantially alter the conditions of flow nor the dwell time of the material in the reserve.

Under normal supply conditions, the mean dwell time of material in the reserve which makes it possible to achieve satisfactory homogenization with no risk of excessive cooling is not greater than 3 minutes and is preferably between 30 seconds and 2 minutes.

Bearing in mind the temperature of the material delivered by the cupola and those needed at the level of the centrifuging apparatus, the temperature drop in the reserve is normally limited to less than 100° C.

To limit heat losses while maintaining an adequate period of homogenization, it is advantageous to construct the reserve in a relatively compact form. This form lends itself likewise to homogenization of the material. This is also favored by appropriately choosing the points of intake and outlet of material in order to develop as complete a "working" as possible.

In addition to homogenization of the material, formation of flows which affect the whole of the volume of the reserve avoids the formation of solidified zones.

The presence of the reserve according to the invention also makes it possible to eliminate heterogenous particles referred to earlier.

By way of indication, the particles of coke entrained with a density less than that of the molten material will float to the surface of the material in the reserve. These incandescent particles are consumed rapidly in the ambient gases and disappear when they have been present for a sufficient period. To facilitate their total combustion, it is according to the invention advantageous to provide, on the free surface of the reserve, means which will form a kind of dam so that the particles are retained until their combustion is completed.

Advantageously, the dam-forming means on the free surface of the reserve, surrounding the zone in which the material enters the reserve, will at the same time constitute a protection against any splashes. Such protection is useful particularly when a difference in levels between the pouring hole and the free surface of the reserve is considerable and consequently when the rate of flow and/or fall is rapid.

This protection may advantageously take the form of a wall surrounding the material pourer—without thereby channelling the material—and protecting it simultaneously from excessively intense heat exchanges with the neighboring atmosphere. To form a dam on the surface, a wall is immersed in the reserve of material. The height of the immersed part of this wall is regulated so that the particles of coke cannot cross it.

Preferably, according to the invention, the material is evacuated by means of an overflow from the surface of the reserve. In this case, it is possible to use the reserve as a means of separation of heterogeneous matter such as cast iron which, having higher density, will collect in the bottom of the reserve. Thence, periodic emptying makes it possible to eliminate this cast iron without upsetting production except for a minimum of time.

If the temperature of the material delivered by the cupola is insufficient to achieve the most satisfactory fibering conditions, heating of the material may take place in the reserve, for example by means of burners whose flames are directed onto the free surface.

After having left the reserve, the material is conveyed to the fibering apparatus by means of one or more successive channels. On its path, it is preferable to dispose means which may possibly direct the flow "to earth" and not on to the fiber-forming apparatus. In this operation, when for any reason whatsoever production of fibers must be momentarily discontinued, the continuous flow is poured into a discharge.

According to the invention, it is advantageous to provide at the exit from the reserve a tilting channel which makes it possible to instantaneously change from normal flow to a flow to earth.

It is likewise advantageous, in order to convey the material to the centrifuging wheels, to dispose a terminal channel or pourer at the end of the route and the position of which may be adjusted to allow perfect location of the pouring onto the first wheel.

The presence of successive ducts between the reserve and the fiber-forming apparatus helps to regularize the flow of material as the route chosen must bear in mind the conditions of temperature and in particular the conditions of devitrification which have been mentioned in connection with the reserve.

It can be added generally that a certain amount of devitrification, far from being harmful, may contribute to regularity of operation. Thus, above the reserve and beside the area where the material enters, an arch of solidified material may possibly form. This will not interfere with operation of the reserve and may even protect it from excessively intense cooling on contact with ambient air. Similar phenomena may develop on the various ducts which convey the material to the centrifuging wheels.

BRIEF DESCRIPTION OF THE DRAWINGS

A more completely appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

In conventional forms of supply, a pouring threshold 1 is provided at the base of the cupola 2. This threshold is conventionally extended by a pourer 3 which delivers the material to the outside of the enclosure in which the fiber-forming operation takes place.

Figure 1:
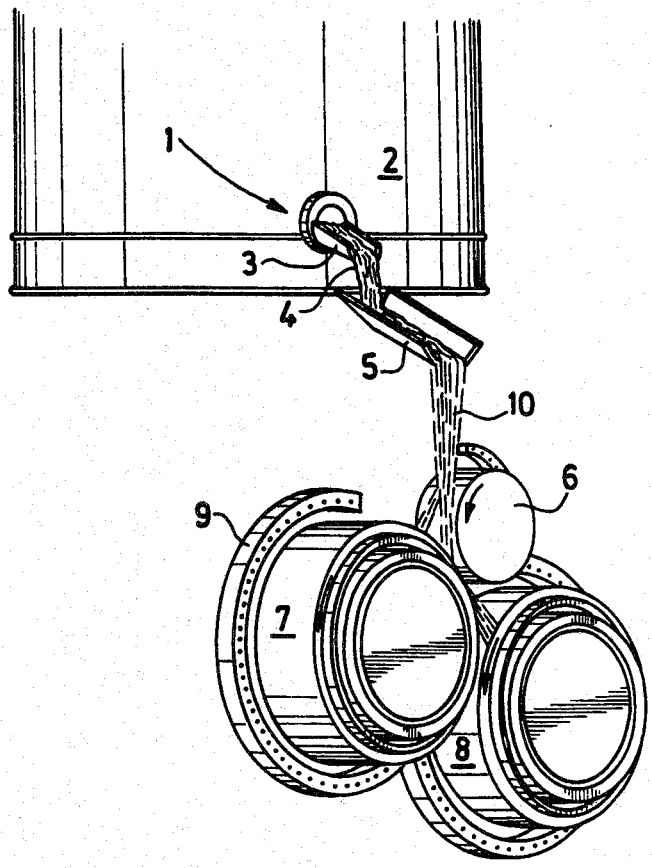
FIG. 1 is a diagrammatic perspective view of a conventional method of feeding a fiber-forming apparatus.

The flow of material 4 from the pourer 3 is collected in a channel 5 which is located partly inside the fiber-forming enclosure and partly outside this enclosure. In FIG. 1, the wall of this enclosure and the aperture which allows passage of the channel are not shown. Not shown either are the circuits which bring in and take away the water which is used for cooling, particularly for the channel 5.

The material conveyed by the pourer 5 flows over the first wheel 6 of the centrifuging apparatus and then in succession over the wheels 7 and 8 which turn in opposite directions to each other. During the course of this progression, part of the material adheres to the wheels and then becomes detached therefrom in the form of filaments which are picked up by a flow of gas issuing along the periphery of the wheels from blower heads 9. The gas flow completes the drawing of the filaments thrown out by the wheels and entrains the fibers formed to a conveyor on which they are collected, the excess material not having adhered to a wheel being passed on to the next wheel.

In this drawing, for reasons of clarity, the filaments and fibers have not been shown.

The fiber centrifuging apparatus in this drawing comprises three wheels. It is likewise possible to work with a different number of wheels, in particular with an apparatus having four wheels.

In these fiber-forming techniques, the first wheel in the path of the material mainly plays a role of accelerating and distributing the material. For this wheel to be able to properly carry out its role, it is important for the flow of material 10 from the channel 5 to be correctly located in relation to this wheel 6. To regulate the position of the flow 10 and consequently the point of impact on the wheel 6, the channel 5 may be moved.

Furthermore, when the supply to the centrifuging apparatus has to be discontinued, a supplementary duct is interposed between the pourer 3 and the channel 5 outside the enclosure in which the fibers are formed. This ducting is not shown in FIG. 1.

In the conventional embodiment shown in this drawing, it will be seen that instabilities in the flow of material emerging from the pouring threshold 1 proceed virtually without any attenuation as far as the centrifuging apparatus. These instabilities in flow will in particular modify the trajectory of the flow 10 and the point of impact on the wheel 6. Localization of the material on the wheels which very substantially affects the fiber formation is also seriously upset in consequence thereof. Heterogeneous elements such as coke or cast iron which may also be entrained by the material will inevitably pass onto the centrifuging apparatus with the disadvantages mentioned earlier.

Figure 2:
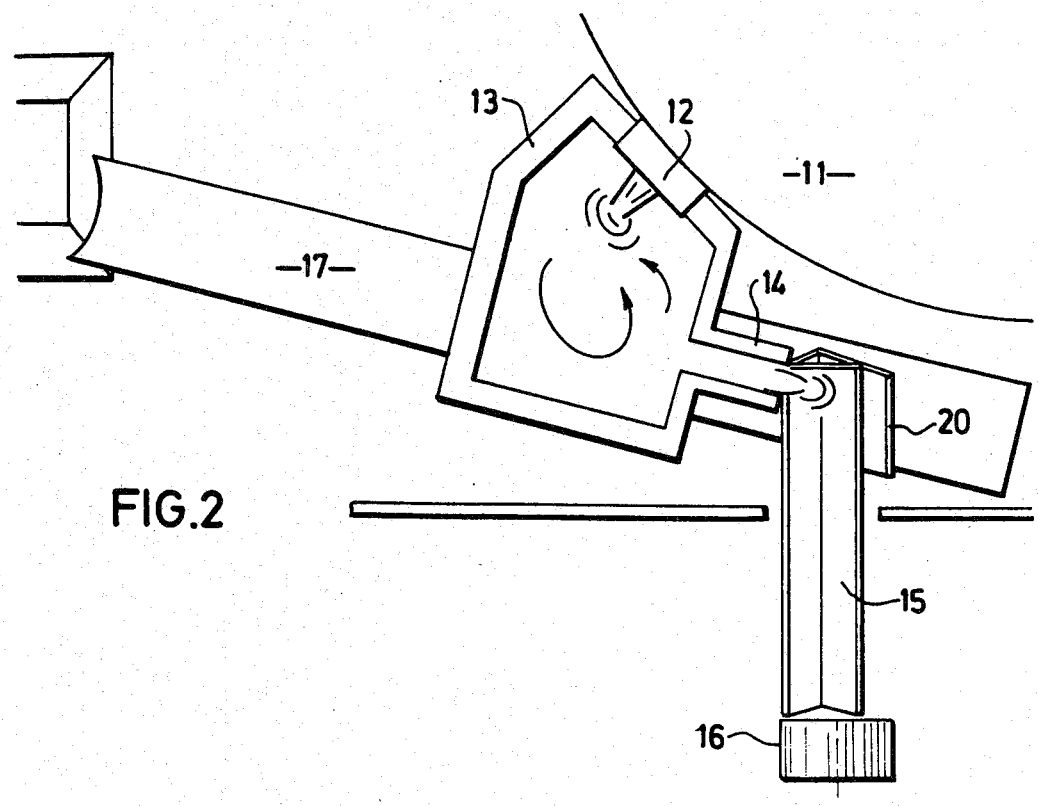
FIG. 2 is a plan view of an embodiment of a feed arrangement according to the invention.
Figure 3:
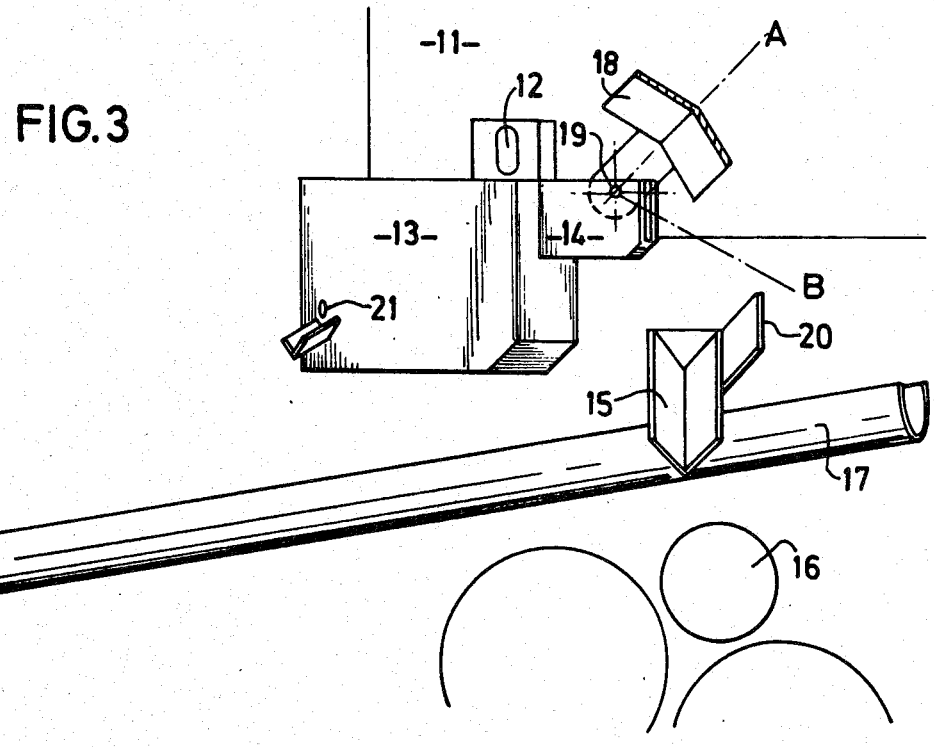
FIG. 3 is a frontal view similar to that in FIG. 2.

FIGS. 2 and 3 show a first embodiment of the invention which makes it possible to approve the supply.

The material prepared in the cupola 11 is removed by a pouring threshold 12. It flows into a reserve constituted by a pre-crucible 13. From this precrucible, the material flows over the overflow 14 into a terminal channel 15 and is carried to the first wheel 16 of a centrifuging assembly.

The assembly is completed by a means for pouring to earth. In FIGS. 2 and 3, this means comprises on the one hand a channel 17 for evacuating the material and a movable deflector 18 which is shown (in section) only in FIG. 3. In this drawing, the assembly is in the normal pouring position for fiber production. In this position the deflector 18, articulated about an axis 19 and driven for example by means of a jack (not shown), is raised in such a way as not to impede the flow of material which thus passes from the overflow 14 to the channel 15. When the deflector rotates about axis 19 from the raised position, shown by its radial line A, to the lowered position, shown by radial line B, the material coming from the overlow 14 is intercepted and directed towards the channel 17 which discharges it. This assembly makes it possible to instantaneously interrupt the supply.

The supply of material to the pre-crucible 13 is angled in relation to the flow from the overflow 14. Furthermore, the shape of the pre-crucible is chosen in such a way that the movement of material therein affects all the material contained in the reserve. It is particularly necessary to avoid a direct flow from the threshold to the overflow which would essentially cancel out the advantages of homogenizing the material which are obtained when the invention is carried out effectively. In the drawing, arrows are used in order to symbolically show the working or mixing in the precrucible. The effective movement of material is more complicated than that which is possible to show, insofar as it develops in a three dimensional space.

The pre-crucible must be capable of withstanding attack from high temperatures of the material. It is appropriate to use a double walled water cooled steel assembly. The drawings do not show the water inlets and outlets. The bottom of the crucible may be reinforced by a layer of refractory material, for example of the carbon thread type.

Intense cooling of the pre-crucible results in formation of a layer of solidified material of relatively small thickness—the volume occupied by the solidified material is small in relation to that of the material in the molten state and in any case remains less than 15%—which effectively protects the inner wall.

In the same way, the terminal channel 15 is cooled by circulation of water at least in the zone receiving the flow from the pre-crucible.

To avoid splashes of material as it passes from the overflow 14 to the channel 15, the latter may possibly be provided with a supplementary screen 20 in the area where the flow of material strikes.

The pre-crucible 13 may include an orifice 21 situated close to its base for emptying the precrucible. By using a small dimension orifice, solidification of material in the thickness of the cooled wall guarantees fluid tightness of the apparatus in normal functioning. When the crucible has to be emptied, for instance in order to remove accumulated cast iron, it is possible to pierce or drill through the material obstructing the orifice.

This operation may be confined to removal of the cast iron. In this case, as soon as the fiber-forming material is flowing, a solid plug can be reformed by momentarily cooling in a more intense fashion.

Figure 4:
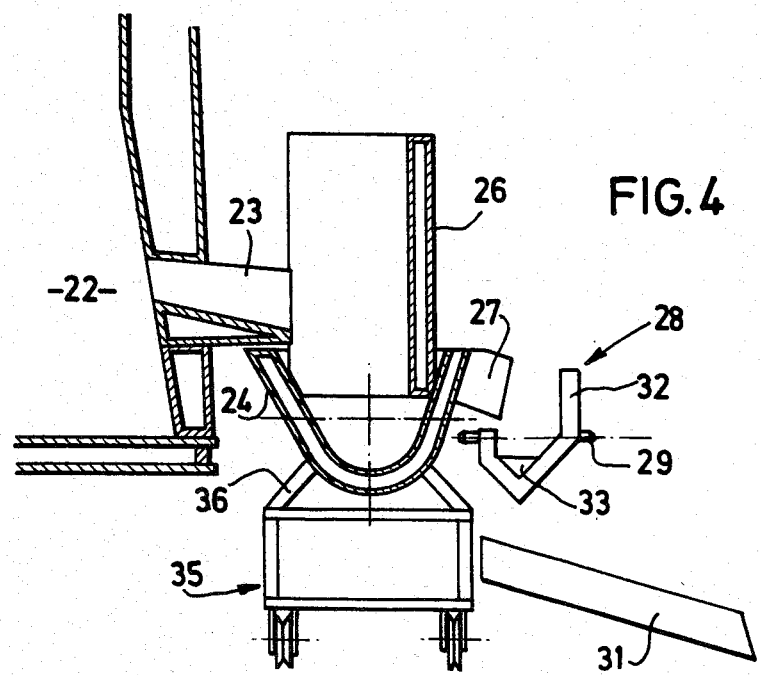
FIG. 4 is a partial section through a second embodiment of the invention.
Figure 5:
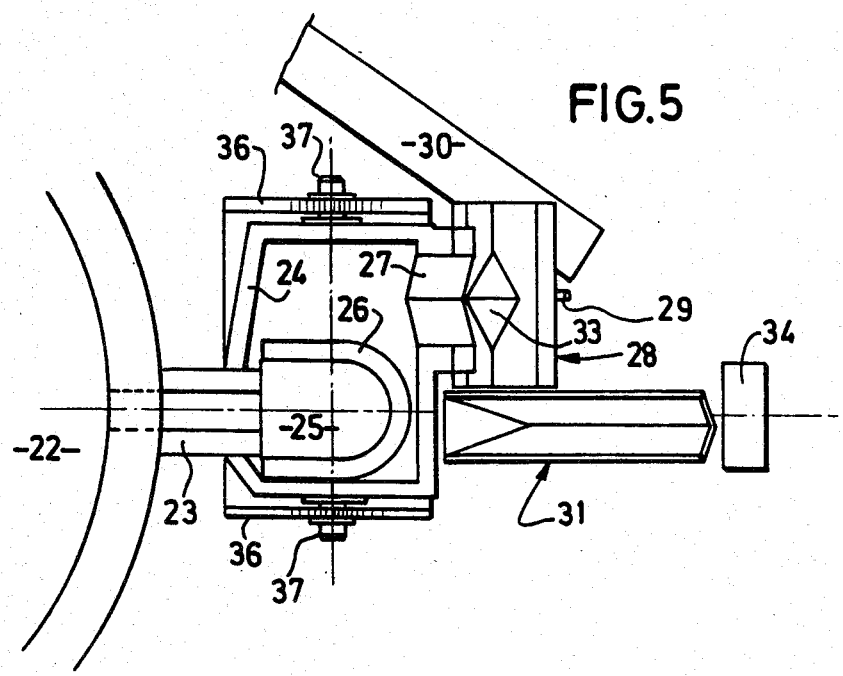
FIG. 5 is a plan view of the second embodiment.

FIGS. 4 and 5 show another embodiment of the invention.

As previously noted, the molten material emanates from a cupola. It is evacuated via the pourer 23. The cupola and the pourer are cooled by circulation of water within their double walls.

The molten material flows into the pre-crucible 24 in a zone 25 defined at least on the surface by a protective wall 26. The lower part of which wall 26 is immersed in the reserve of material accumulated in the pre-crucible 24 so that floating elements such as pieces of coke cannot escape with the material through the overflow 27.

Furthermore, the wall 26 acts as a screen against any splashes caused by the material being poured into the pre-crucible. This wall also partially protects the poured material from cooling by restricting the movements of ambient air and by partially confining to the proximity of the reserve the gases emanating from the cupola.

The wall 26 and pre-crucible 24 are ideally of double walled steel, cooled by circulation of water.

The material passes from the pre-crucible into a channel 28 which is adapted for rotation on pivots 29 engaging in bearings fixed on supports, not shown. This tilting channel may be inclined to one side or the other in such a way as to direct the material either to a channel 30 by which it can be poured to earth and which is partially shown in FIG. 5, or onto the end channel 31.

The tilting channel 28 advantageously has a higher wall 32 on the side opposite the overflow 27, once again to avoid splashing of material. This channel is likewise water cooled. In the embodiment shown, the bottom of this channel, at the place where the material from the overflow 27 is emptied is protected by a lining of refractory material 33.

The end channel 31 which leads the material to the first wheel 34 of the centrifuging apparatus may possibly also be cooled by circulation of water, at least in the part receiving the material poured from the tilting channel 28.

In the embodiment shown in FIGS. 4 and 5, the pre-crucible 24 is mounted on a carriage 35 through two consoles 36. Two pivots 37 fixed to the pre-crucible 24 are engaged in bearings carried by these consoles 36. The pre-crucible is thus able to tilt on its axis in order, for example, to be emptied and/or to eliminate any excess cast iron as stated previously. In the embodiment illustrated, tilting is preferably towards the cupola which eliminates the need for a centrifuging apparatus. The material poured from the cupola, a process which is continuous, is then eliminated from time to time together with the contents of the pre-crucible.

The assembly constituted by the pre-crucible 24, the tilting channel or spout 28 and the end channel or spout 31 is preferably carried by the carriage 35. A plurality of independent means are provided in accordance with the invention to ensure adjustment of the position of the poured material on the wheel 34.

A first of the independent means consists of displacement of the carriage 35 in a direction parallel with tilting axis of pivots 37, that is to say in a direction which is ordinarily at right-angles to the axis of rotation of the centrifuging wheels.

It must be remarked that in this displacement, which is always by a small amount when adjustment of the position of the poured material on the wheel 34 is concerned, the wall 26 should preferably by maintained in position in relation to the pourer 23 which makes it possible to preserve the advantageous conditions which arise from use of this wall. For this reason, the wall 26 is preferably carried by the cupola by mechanical means not shown.

The preceding movement which we will describe as a longitudinal movement may be supplemented by a transverse movement in a direction at right-angles to the former i.e. parallel to the axis of pivots 29. This transverse movement is preferably performed by movement of the end channel 31 and likewise ensures the position of impact of the pouring of material on the wheel 34.

In a particular embodiment, the assembly consisting of the tilting channel 28 and the elements constituting the end channel 31 (this latter may consist in particular of a plurality of telescopic elements) are fixed on a table mounted on the carriage 35 and adapted for movement thereon. This moving table permits displacement of the end channel 31 according to a combination of two perpendicular directions (i.e. movement of carriage 35 and movement of the table thereon). The movements are for example performed by two linear electric motors or two jacks. This moving table is advantageously propelled on a cushion of air in order to facilitate displacement.

The combination of these independent supply regulating means with the means for sensing the position of impact on the wheel, for example, visual means, makes it possible to ensure automatic adjustments. Of course, manual adjustment is also possible.

Tests have been carried out by way of comparison, using for the same apparatus and under the same conditions a system of supply using a single channel as shown in FIG. 1 versus an assembly comprising a precrucible, tilting channel, and end channel as shown in FIGS. 4 and 5.

To establish the efficiency of the devices according to the invention, these tests were carried out under conditions which from the point of view of stability of supply were previously found to be the least satisfactory. These conditions correspond to a relatively high rate of flow for the type of cupola used for melting the material. The regularity of functioning of these cupolas becomes less satisfactory the closer one is to their upper or lower production limits.

For example, the cupola used for these tests permits a maximum flow of rate of flow of between 7000 and 8000 kg/h. The momentary variations in rate of flow found may be as much as 10% for the highest flow rates whereas for a rate of flow of 3000 kg/h for example, these fluctuations remain less than 5%.

In all cases, these considerable variations necessarily influence the conditions of fiber production and hence the output of fibers defined as the ratio of the mass of material which, in the end product, has sufficient fineness to that of the material delivered by the cupola.

Arbitrarily for the measurements conducted in these tests, a fineness limit of 40 micrometers was adopted. Only fibers with a diameter smaller than this limit were taken into consideration.

In the embodiment of the invention, the capacity of the reserve (pre-crucible) is of the order of 80 liters. For a rate of flow of 6500 kg/h, bearing in mind the volumetric mass of the material which is around 2.7, such a reserve corresponds to approximately 2 minutes of production. Of course, a greater volume reserve can be used for the highest rates of flow in order to prolong the mean dwell time in the reserve and improve the finishing of the material.

Even when working under these limit conditions, for a rate of flow of around 6500 kg/h, the embodiment according to the invention makes it possible to considerably improve the regularity in supply. At any given time, the variation in rate of flow does not exceed 2% of the mean rate of flow.

The effect of this improvement is to quite substantially to increase the fiber output, by 8 to 10 points according to tests. A similar improvement, even though it may be less impressive, is likewise found for more limited rates of operation such as 3000 kg/h.

Furthermore, operation of the invention makes it possible to overcome difficulties linked with the presence of foreign bodies such as coke particles or the presence of cast iron in the material issuing from the cupola. Interruptions in production are less frequent and are of shorter duration. Consequently, production under these conditions is greatly improved.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of continuously supplying fiber forming mineral material in a fiber producing apparatus, comprising the steps of:
   delivering fiber forming mineral material in liquid form and at an elevated temperature from a cupola to a reserve means having a free surface;
   discharging said material at said free surface to a first wheel of a fiber producing apparatus including centrifuging wheels rotating in opposite directions; and
   permitting said material to flow to others of said centrifuging wheels while forming filaments, wherein said delivering step includes the step of delivering said material to said reserve means with a volume sufficient that said material is homogenized therein and with said free surface of an area such that a flow rate of said discharging step does not exceed 2% of a mean flow rate thereof, regardless of momentary variations in a flow rate of said delivering step.

2. A method according to claim 1 in which a volume of said reserve is chosen as a function of the rate of said flow rate under operating conditions so that said reserve represents between 30 seconds and 3 minutes of operation.

3. A method according to claim 2, wherein said volume of said reserve and a dwell time which results therefrom are chosen so as to maintain a drop in temperature of the material at less than 100° C.

4. A method according to claim 1 including the step of providing dam means disposed in the path of material on a free surface of said reserve to hold back any floating foreign bodies at said free surface.

5. A method according to claim 2 including the step of providing dam means disposed in the path of material on a free surface of said reserve to hold back any floating foreign bodies at said free surface.

6. A method according to claim 3 including the step of providing dam means disposed in the path of material on a free surface of said reserve to hold back any floating foreign bodies at said free surface.

7. The method of claim 1 wherein said material consists of one from the group consisting of basaltic rock, blast furnace slag, combinations of materials including blast furnace slag, and glasses which melt at elevated temperatures.

8. An apparatus for continuously supplying fiber forming mineral material in a fiber producing apparatus having a plurality of oppositely rotating centrifuging wheels, comprising:
   material reserve means having sufficient volume that said material is homogenized therein and having a free surface;
   means for delivering said material in liquid form and at elevated temperature from a source thereof to said reserve means; and
   means for discharging said material at said free surface from said reserve means to a first wheel of said fiber producing apparatus,
   wherein said reserve is constructed such that said free surface has an area such that a flow rate of said material from said discharging means does not exceed 2% of a mean flow rate thereof, regardless of momentary variations in a flow rate from said means for delivering.

9. The apparatus of claim 8 including a wall positioned in said reserve means such that said wall is partially immersed in said free surface, wherein said means for delivering includes means for delivering to a zone of said free surface on one side of said wall, and wherein said means for discharging includes means for discharging said material at said free surface on another side of said wall.

10. The apparatus of claim 9 wherein said means for delivering and said means for discharging are positioned such that a delivering direction is angled relative to a discharging direction as seen on a plane of said free surface.

11. The apparatus of claim 8 wherein said means for discharging comprises an end channel positioned for delivering said material from said reserve means to said fiber producing apparatus, further comprising:
an evacuating channel positioned for discharging said material to earth; and
a movable deflector mounted for movement to a deflecting position interposed between said reserve means and said end channel for deflecting said material to said evacuating channel.

12. The apparatus of claim 11 wherein said deflector comprises a tilting channel tiltable between said deflecting position and a position in which said material is permitted to be delivered to said end channel.

13. The apparatus of claim 11 wherein said reserve means is mounted for pivoting about a horizontal axis.

14. The apparatus of claim 13 wherein said end channel is mounted for movement along said horizontal axis and in a horizontal direction transverse thereto.

15. The apparatus of claim 14 including a carriage movable along said horizontal axis, wherein said reserve means is mounted on said carriage, and including a motor driven table for movably mounting said end channel on said carriage.

* * * * *